Oct. 21, 1969    J. D. AINSWORTH    3,474,321
STATIC INVERTER CONTROL CIRCUITS
Filed Feb. 2, 1968    4 Sheets-Sheet 4

United States Patent Office 3,474,321
Patented Oct. 21, 1969

3,474,321
STATIC INVERTER CONTROL CIRCUITS
John Desmond Ainsworth, Stafford, England, assignor to The English Electric Company Limited, London, England, a British company
Filed Feb. 2, 1968, Ser. No. 702,651
Claims priority, application Great Britain, Feb. 3, 1967, 5,455/67
Int. Cl. H02m 7/04
U.S. Cl. 321—5
10 Claims

ABSTRACT OF THE DISCLOSURE

This invention relates to a circuit for controlling the application of firing pulses to a number of controlled devices, e.g. mercury arc valves, in a polyphase static inverter. In particular, it comprises an oscillator from which these pulses are developed and which has an output frequency dependent on the magnitude of an input signal, the signal being a function of any difference between the actual and desired values of margin angle "$\gamma$" for any one of the valves whereby to influence the frequency of the pulses and control the firing angle "$\alpha$" in such a sense as to reduce the difference towards zero.

The firing pulses are applied to the valves from corresponding stages in a ring counter driven by an oscillator, a measuring circuit being associated with each stage of the counter and sequentially activated thereby to measure the margin angle of the valve from which commutation has just proceeded.

One of the principal advantages of this invention is that the spacing between the firing pulses is accurately maintained at a constant value even in the event of considerable asymmetry in the A.C. circuits.

---

This invention relates to control circuits for static inverters, and such circuits may conveniently be employed in static convertors, that is, apparatus for effecting conversion between A.C. and D.C.

From one aspect, the present invention consist in a circuit for controlling the application of firing pulses to a plurality of controlled devices in a polyphase static inverter, comprising an oscillator for developing said pulses and having an output frequency dependent on the magnitude of an input signal, said signal being a function of any difference between the actual and desired values of margin angle "$\gamma$" for any one of said devices whereby to influence the frequency of the pulses and control the firing angle "$\alpha$" in such a sense as to reduce said difference towards zero.

The firing angle "$\alpha$" is defined as the period, in electrical degrees, for which the instant of firing any particular controlled device, e.g. a mercury pool valve or a thyristor, is delayed following the instant of natural commutation of the valve, that is, the instant at which its anode potential rises above its cathode potential, and the margin angle "$\gamma$" is the period, in electrical degrees, during which the valve is to deionise completely before its anode potential crosses the zero datum again and rises above its cathode potential.

The firing pulses may conveniently be applied to the valves from corresponding stages in a ring counter driven by the oscillator, a measuring circuit being associated with each stage and sequentially activated thereby to measure the margin angle "$\gamma$" of the valve from which commutation has just proceeded. In particular, the measuring circut may comprise a waveform generator initiating a predetermined rate-of-change of voltage at the instant commutation is completed between an associated pair of valves, i.e. at the instant $wt=\alpha+u$ (where "$u$" is the commutation overlap angle), and a control circuit for sampling this voltage at the instant at which the potential across the valve from which commutation has proceeded crosses the zero datum ($wt=\pi$). The voltage obtaining at the instant at which it is sampled serves as the input to the oscillator, and the frequency of the pulses produced thereby is dependent on the magnitude of this voltage; since the period between the initiation of the voltage change and the instant at which it is subsequently sampled is the margin angle "$\gamma$" ($wt=\pi=\alpha+u+\gamma$) the frequency of oscillation is thus dependent on the margin angle.

Preferably, the outputs from all the measuring circuits are connected to the oscillator through a common selector circuit operable to apply to the oscillator only that voltage representative of the smallest margin angle measured by these circuits during each cycle.

With a circuit according to this invention the spacing between the firing pulses is constant during steady state operation, i.e. 60° for a six-pulse convertor, and this spacing is accurately maintained even in the event of considerable asymmetry in the A.C. circuits. This feature constitutes one of the most important advantages of this invention since in many control systems hitherto proposed asymmetry in the A.C. circuits has tended to produce unequal spacing between firing pulses leading to the generation in the converter of harmonic components different from those theoretically predictable, i.e. different from the fifth, seventh, eleventh, thirteenth harmonics, etc., for which filters are normally provided. This is particularly true if the A.C. system impedance is high. Furthermore, such unpredictable harmonics produced by asymmetry may readily be magnified by converter operation, and can ultimately result in instability. Another effect produced by unequal spacing between firing pulses is that of producing a resultant D.C. component in the secondary windings of the A.C. transformers, and since in large convertor installations, e.g., H.V.D.C. systems, the percentage transformer magnetising current is small the transformer cores become saturated relatively easily and this further distorts the primary currents.

In order that the invention may be fully understood, one embodiment thereof will now be described with reference to the accompanying drawings, in which.

Figure 1:
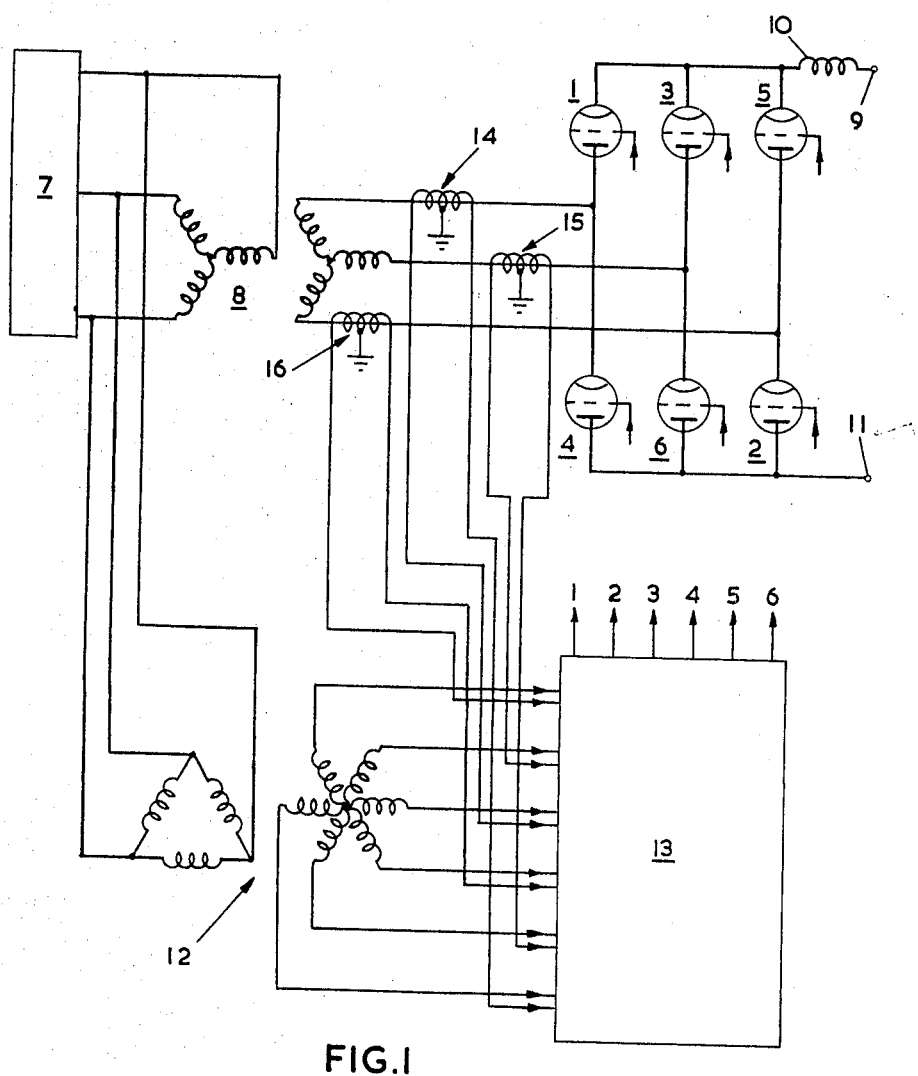
FIGURE 1 is a schematic diagram of a six-pulse converter circuit.
Figure 2:
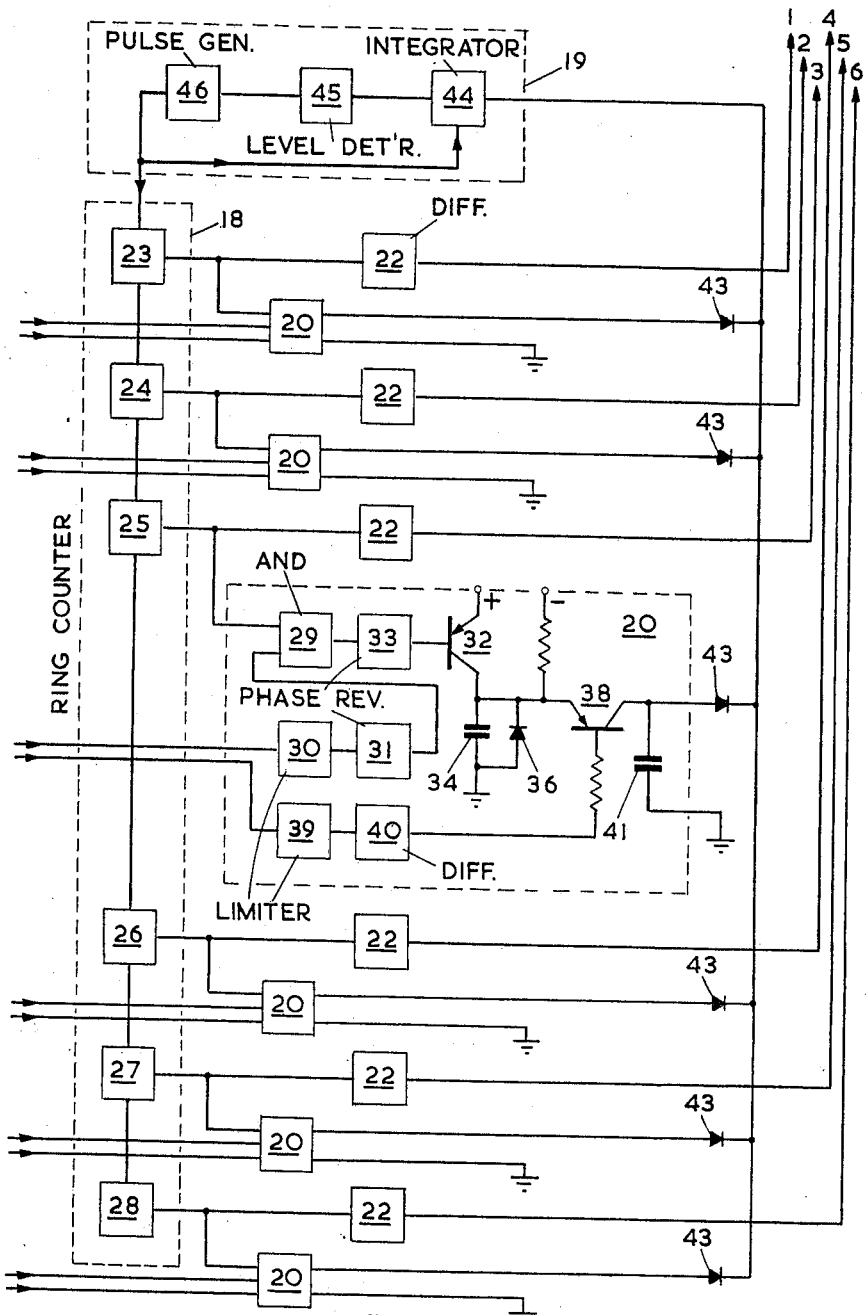
FIGURE 2 is a circuit diagram of the control circuit shown in FIGURE 1.
Figure 3:
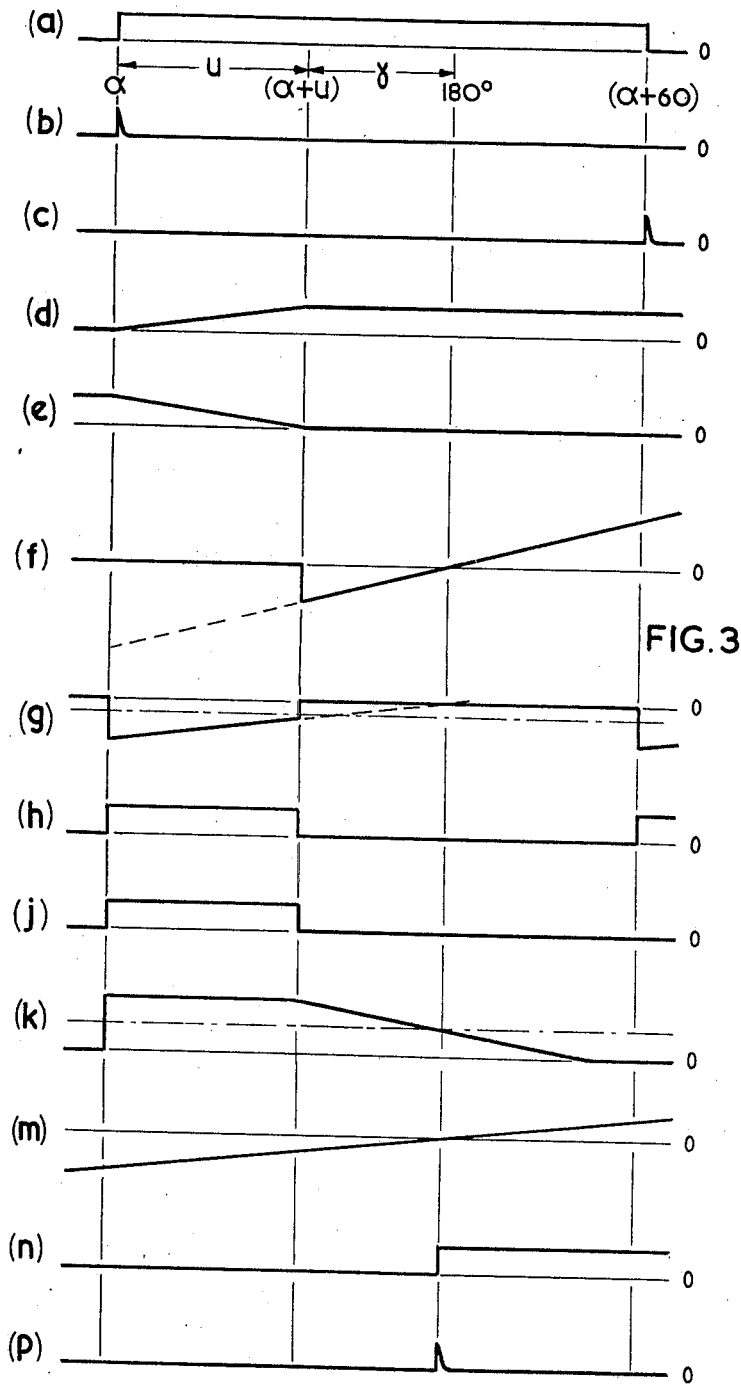
Figure 4:
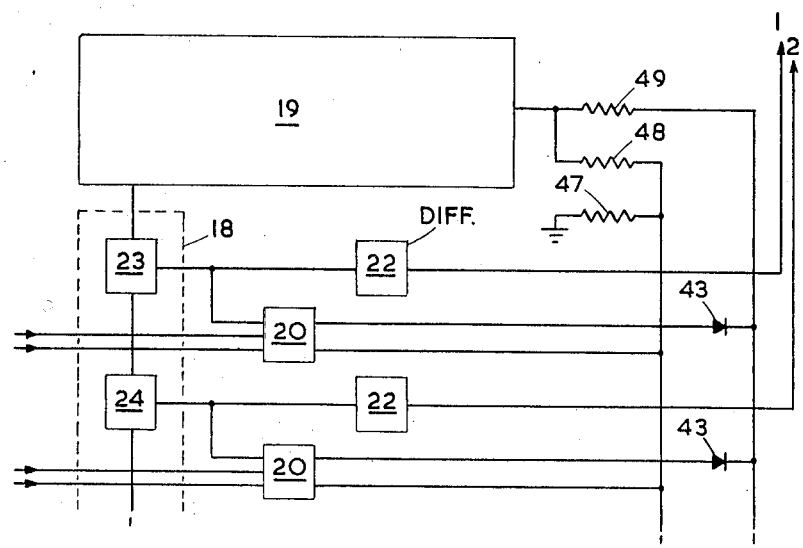

FIGURES 3(a) to 3(p) show waveforms obtained at various positions in the circuits shown in FIGURES 1 and 2; and FIGURE 4 shows a modification of the circuit in FIGURE 2.

Referring now to FIGURE 1, there is shown a six-pulse convertor circuit having six mercury-pool valves 1 to 6. More particularly, the circuit includes a three-phase A.C. power supply 7 the output of which is applied to a star-connected primary of a convertor transformer 8, the secondary windings of which are respectively connected to the anode-cathode junctions of series-connected to the anode-cathode junctions of series-connected valves 1 and 4, 3 and 6, and 5 and 2. The cathodes of valves 1, 3 and 5 are connected together to a D.C. terminal 9 through a smoothing reactor 10, and the anodes of valves 4, 6 and 2 are connected together to another D.C. terminal 11.

The output from the A.C. power supply is also supplied to a delta-connected primary winding of a voltage transformer 12, the secondary winding being connected in diametral star so as to rovide a six-phase input to a grid control circuit 13. This circuit is operable to govern the firing angle "$\alpha$" of the valves during the inversion mode, i.e. $90° < \alpha \leqslant 180°$, in dependence on the smallest margin angle "$\gamma$" possessed by any one of these valves, this latter quantity being measured in a manner to be described, under the control of inputs supplied from both the transformer 12 and sensing circuits 14, 15 and 16 coupled to the secondary windings of the transformer 8. In particular, these sensing circuits consist of a centre-tapped differentiating current transformer, that is, a current transformer having an air-gapped core and operated with a very high load impedance, i.e. substantially an open circuit.

Referring now to FIGURE 2, the control circuit 13 is shown in more detail and comprises a ring counter 18 the counting rate of which is determined by a voltage-controlled oscillator 19 which is itself controlled in dependence on the smallest one of the margin angles "$\gamma$" measured by circuits 20. The two circuits 19 and 20 together with the counter 18 thus constitute a closed-loop control, the firing pulses for the mercury valves being taken from a parallel output from the appropriate counter stages through differentiator circuits 22.

The operation of the control circuit 13 will now be described in detail with reference to this figure together with the waveforms shown in FIGURES 3(a) to 3(p), which pertain to the conductive states of some of the convertor valves and waveforms occurring at various positions in the measuring circuit 20 associated with the valve 3.

The ring counter 18 comprises six stages 23–28 and is normally driven at six times the system frequency from the oscillator 19, an output being produced successively from each stage in the form of a rectangular pulse of nominal length 60° electrical. These pulses are differentiated in the differentiator circuits 22 and the resultant positive spikes produced at the leading edge of these pulses constitute the firing pulses for the mercury valves. FIGURE 3(a) shows the rectangular pulse applied to the differentiator 22 from the stage 25 and FIGURE 3(b) shows the resultant firing pulse produced from this pulse for valve 3 at $wt=\alpha$ for this valve. The succeeding firing pulse, for valve 4, is shown in FIGURE 3(c).

With the application of the firing pulse to valve 3, its current rises (FIGURE 3(d)) whilst the current through the valve 1 from which the commutation has produced falls towards zero (FIGURE 3(e)). The time taken for this current to fall to zero is finite and extends over a period $u$ electrical degrees the angle "$u$" being the commutation overlap angle, e.g. 20°. Commutation is therefore complete at $wt=\alpha+u$ and at this instant the anode-cathode voltage of valve 1, which had previously been nearly zero whilst the valve was conducting current, now assume a sinusoidal form (FIGURE 3(f)) instantaneously assuming a negative value and crossing the zero axis at $wt=\pi$. The margin angle, that is, the period during which the valve must deionise completely before its anode potential rises above its cathode is thus the angle "$\epsilon$" between $wt=(\alpha+u)$ and $wt=\pi$.

Now the rectangular pulse (FIGURE 3(a)) from the counter stage 25 is also applied to an AND gate 29 together with a pulse dependent on the rate of change of current through the valve 1 from which, it will be recalled, commutation proceeds to valve 3. This rate of change of current is determined by the differentiating transformer of the sensing unit 14 as shown in FIGURE 3(g), the output extending from $wt=\alpha$ to $wt=(\alpha+u)$ and is applied to an amplifier-limiter 30 which produces a rectangular pulse therefrom having a period equal to that for which the waveform of FIGURE 3(g) exceeds a critical level given by the dashed lines in that figure. The output from the amplifier-limiter is applied to a phase reverser 31 and its output (FIGURE 3(h)) is applied to the AND gate 29. The coincident output pulse from this AND gate 29 (FIGURE 3(j)) has a period the same as that shown in FIGURE 3(h) and is applied to a transistor 32 through another phase reverser 33, the transistor being turned-on for the duration of this pulse whereby to charge capacitor 34, the voltage across this capacitor being shown in FIGURE 3(k). Upon the cessation of the pulse, transistor 32 is turned-off and the capacitor discharges towards the negative supply potential until it is arrested at about ground potential by a diode 36. The voltage across this capacitor iss applied to the emitter of a transistor 38 which is rendered conductive in dependence on a pulse derived from the secondary of the voltage transformer 12.

More particularly, the secondary voltage applied to the measuring circuit 20 associated with valve 3 is a sine wave (FIGURE 3(m)) crossing the zero axis at the same instant, and in the same sense, as the anode-cathode voltage of valve 1. The positive half of this alternating input is amplified by an amplifier-limiter 39 (FIGURE 3(n)) so as to produce a rectangular pulse and this is then differentiated by a differentiator circuit 40, the positive spike (FIGURE 3(p)) being applied to the base of transistor 38 whereby to turn-on this transistor for the short duration of this spike which occurs once per cycle for each valve. Connected to the collector of this transistor is a capacitor 41 having a capacitance large compared with that possessed by the capacitor 34 connected to its emitter, and the effect of the application of the spike or "sampling" pulse to the base of this transistor 38 is to cause it to clamp the voltage on the capacitor 41 to that value possessed by the capacitor 34 at the instant of application of this sampling pulse, i.e. $wt=\pi$. With the effective resistance across the capacitor 41 arranged to be very high (transistor 38 is virtually an open-circuit when non-conducting) the voltage across this capacitor therefore remains at a substantially constant value between the sampling pulses as shown by the dashed lines in FIGURE 3(k).

Accordingly, the voltage which appears across the capacitor 41 between the sampling pulses, i.e. for the duration of one cycle, is dependent on the margin angle "$\gamma$" of the valve from which commutation has proceeded since it will be appreciated that if "$\gamma$" increases then the voltage across capacitor 34 will have fallen to a lower value than shown at $wt=\pi$, and conversely, if "$\gamma$" decreases the voltage will be at a higher value at this instant, the discharge waveform of this capacitor always being of fixed shape and being initiated at the instant of current zero in valve 1 ($wt=\alpha+u$).

The six constant voltage outputs from the measuring circuits 20 are respectively connected through six diodes 43 to a common input to the voltage-controlled oscillator 19, the net voltage at this input thus being equal to the highest voltage delivered by any one of the measuring circuits, i.e. corresponding to the smallest margin angle "$\gamma$".

The input circuit of this oscillator 19 comprises an integrator 44 which delivers a ramp voltage, having a rate-of-charge proportional to the input voltage, to a level detector or trigger circuit 45. In turn, this circuit 45 triggers-on a pulse generator 46 at a predetermined level of the ramp voltage which applies a pulse to the input of the ring counter 18 and resets the integrator 44 to zero through a feedback loop. The cycle then continues.

The voltage-controlled oscillator thus delivers a train of pulses to the counter at a repetition rate proportional to its D.C. input voltage. In the steady state, this voltage is substantially constant and is of such a value as to make the output frequency of the oscillator precisely six times the output frequency for the inverter described, and with the phase of the counter pulse output relative to the A.C. line voltages (i.e. the angle $\alpha$) of such a value as to produce the desired margin angle "$\gamma$". Should the margin angle decrease then the oscillator control voltage increases temporarily to increase the pulse repetition frequency of the oscillator and thus retard the firing pulses so that "$\alpha$" is made smaller with the result that "$\gamma$" is made correspondingly larger to counteract its decrease. Conversely, if the margin angle should increase then the p.r.f. of the oscillator will temporarily increase to advance the firing pulses, the feedback control being operative always in response to the smallest margin angle possessed by any one of the six valves.

As mentioned above, the control voltage to the oscillator is constant during steady-state operation, the spacing between one firing pulse and the next being the same i.e. 60° electrical and the control circuit functions always in a manner tending to maintain this spacing constant.

Furthermore, the circuit is independent of changes in the frequency of the A.C. system since, for example, if the frequency is halved, "$\gamma$", in absolute time, will double, or measured in electrical degrees, will remain the same, the control voltage to the oscillator decreasing to retard the firing pulses to the requisite degree.

It is to be understood that the invention is not limited to the particular arrangement described and various modifications may be made without departing from the scope of this invention. For example, the method described to detect the instants at which the valve voltages cross the zero datum is by applying to the control circuit an input from appropriate secondary windings on the main transformer 12. However, such an arrangement may give rise to errors due to transformer magnetising current and fluctuating D.C. line current values and these may conveniently be avoided by connecting this voltage transformer 12 to the secondary of the transformer 8. Alternatively, a more direct method is to monitor directly the anode-cathode voltage of each particular valve so as directly to obtain a proportional voltage.

Similarly, the instant of current zero for each valve may be detected by connecting a differentiating current transformer directly in series with each valve instead of connecting this transformer in the A.C. system, this arrangement avoiding the generation of the second spurious pulse shown in FIGURE 3($g$). Furthermore, the differentiating current transformer itself may alternatively comprise a mutual inductor, or a plain inductor in the secondary of a conventional current transformer.

Furthermore, additional circuitry may be incorporated to form an "impulse" feedback correction during transients which may otherwise cause errors in the margin angle "$\gamma$" for any of the valves. This modification is shown in detail in FIGURE 4 and involves removing the ground connection from the capacitor 41 in all the circuits 20 and connecting them instead to the junction between two resistors 47, 48 connected between ground and the input to integrator 44 in the oscillator 19. An additional resistor 49 is introduced into the normal feedback loop to the integrator from the circuits 20. In the steady state, since capacitor 41 will already be at the correct voltage at the instant at which the sampling pulse is applied to the transistor 38 no voltage will appear across the grounded resistor 47 and thus no additional voltage will be contributed to the input to the oscillator. If, however, during the occurrence of a transient, the margin angle "$\gamma$" is in error for any valve when the sampling pulse is applied, an impulse voltage appears across this resistor and a corresponding current impulse is applied to the oscillator and added to the input signal from the circuits 20. The oscillator has an integrating characteristic and jumps suddenly in phase and, by suitable choice of the two resistors 47, 48 this "jump" can be arranged to give very nearly the correct margin angle "$\gamma$" for the next valve to fire. Further, smaller corrections may then follow with the circuit ultimately settling down to give the correct margin angle in a few multiples of one sixth of a cycle.

The control circuit described may also incorporate the arrangement disclosed in our co-pending patent application No. 20279/66 for restricting the firing angle "$\alpha$" between maximum and minimum limits in order to prevent the oscillator from permanently losing synchronism in response to violent transients.

It is also to be understood that although this circuit has been described in association with a six pulse converter the concept of this invention may equally well be applied to convertors of other pulse numbers by appropriate modification of the number of stages in the ring counter and of its associated circuitry.

I claim:
1. A circuit for controlling the application of firing pulses to a plurality of commutated controlled devices in a polyphase static inverter, comprising
   sensing means for monitoring predetermined operating parameters of said inverter,
   a plurality of measuring circuits responsive to said sensing means, said measuring circuits being respectively associated with each said device and sequentially activated to measure the margin angle "$\gamma$" of the device from which commutation has just proceeded, and
   an oscillator for developing said firing pulses and having an output frequency dependent on the magnitude of an input signal from said measuring circuits, said signal being a function of any difference between the actual and desired values of margin angle "$\gamma$" for any one of said devices whereby to influence the frequency of the pulses and control the firing angle "$\alpha$" in such a sense as to reduce this difference towards zero.

2. A circuit according to claim 1, comprising
   a ring counter having a plurality of stages corresponding in number to, and respectively associated with, said measuring circuits, the ring counter being driven by said oscillator and being operative to apply said firing pulses to the said devices.

3. A circuit according to claim 2, comprising
   a selector circuit, all said measuring circuits being connected to said oscillator through the selector circuit which is operative to apply to the oscillator only that signal representative of the smallest margin angle measured by these circuits during each cycle.

4. A circuit according to claim 3, wherein each measuring circuit comprises
   a waveform generator for initiating a predetermined rate-of-change of voltage at the instant commutation is completed between an associated pair of devices (i.e. at the instant $wt=\alpha+u$), and
   a control circuit for sampling this voltage at the instant at which the potential across the device from which commutation has proceeded crosses its zero datum (i.e. the instant $wt=\pi$), the voltage obtaining at the latter instant constituting the said input signal to the oscillator.

5. A circuit according to claim 4, wherein said sensing means develops a voltage proportional to, and for the duration of, any rate-of-change of current in the devices, each measuring circuit comprising
   a square wave generator for converting the voltage from this sensing means into a square waveform the trailing edge of which initiates the voltage change by the said waveform generator at the said instant $wt=\alpha+u$.

6. A circuit according to claim 5, wherein the sensing means comprises
   a differentiating current transformer series-connected in each phase of the inverter.

7. A circuit according to claim 5, wherein the waveform generator comprises
   a first switching device actuated by the trailing edge of said square waveform, and
   a first capacitor operable to discharge at a predetermined rate in response to the actuation of the first switching device, and wherein the voltage sampling circuit comprises
   a second switching device instantaneously actuated at the said instant $wt=\pi$, and
   a second capacitor connected across the said first capacitor through said second switching device, the second capacitor assuming the potential obtaining on said first capacitor at the said instant.

8. A circuit according to claim 7, wherein the input signal to the oscillator is constituted by the sum of said voltage at the sampling instant $wt=\pi$ together with voltage impulses occurring at these corresponding instants for each device, the magnitude of these impulses being proportional to any change in the value of the margin angle "γ" from its value in the previous cycle.

9. A circuit according to claim 8, wherein the charge-discharge path of the second capacitor includes
a first resistor which, together with this second capacitor, is connected across the first capacitor through said second switching device, the junction between the resistor and second capacitor constituting the input to said oscillator additional to that effective through said selector circuit whereby a said voltage impulse is developed across the resistor and added to that normally applied through the selector circuit in response to the potential on the second capacitor differing from that on the first capacitor upon actuation of the switching device.

10. A circuit for controlling the application of firing pulses to a plurality of commutated controlled devices in a polyphase static inverter, comprising
sensing means for monitoring predetermined operating perameters of said inverter,
a plurality of measuring circuits responsive to said sensing means, said measuring circuits being respectively associated with each said device and sequentially activated to measure the margin angle "γ" of the device from which commutation has just proceeded,
a selector circuit connected in common to all the measuring circuits and operative to select only that signal therefrom representative of the smallest margin angle measured by these circuits during each cycle, and
an oscillator connected to the selector circuit for developing said firing pulses and having an output frequency dependent on the magnitude of the input signal from said selector circuit, said signal being a function of any difference between the actual and desired values of margin angle "γ" for any one of said devices whereby to influence the frequency of the pulses and control the firing angle "α" in such a sense as to reduce this difference towards zero.

References Cited
UNITED STATES PATENTS

| | | | |
|---|---|---|---|
| 3,099,785 | 7/1963 | Kessler et al. | 321—18 |
| 3,133,240 | 5/1964 | Fischer | 321—38 XR |
| 3,375,427 | 3/1968 | Magner et al. | 321—5 |
| 3,392,319 | 7/1968 | McColl et al. | 321—5 |

JOHN F. COUCH, Primary Examiner

W. M. Shoop, Jr., Assistant Examiner

U.S. Cl. X.R.
321—18, 38